(12) United States Patent
Moore

(10) Patent No.: US 6,282,605 B1
(45) Date of Patent: Aug. 28, 2001

(54) FILE SYSTEM FOR NON-VOLATILE COMPUTER MEMORY

(75) Inventor: Terrill Moore, Trumansburg, NY (US)

(73) Assignee: Moore Computer Consultants, Inc., Itaca, NY (US)

( * ) Notice: Subject to any disclaimer, the term of this patent is extended or adjusted under 35 U.S.C. 154(b) by 0 days.

(21) Appl. No.: 09/301,373

(22) Filed: Apr. 26, 1999

(51) Int. Cl.[7] .................................................. G06F 12/00
(52) U.S. Cl. .............................. 711/103; 711/1; 711/100; 707/3; 707/4; 707/5; 707/200; 707/201; 707/202; 714/15
(58) Field of Search ........................... 707/3–5, 200–206; 711/1, 100, 103; 714/15

(56) References Cited

U.S. PATENT DOCUMENTS

| | | | |
|---|---|---|---|
| 4,956,774 | * | 9/1990 | Shibamiya et al. ....................... 707/2 |
| 5,404,485 | | 4/1995 | Ban . |
| 5,408,652 | * | 4/1995 | Hayashi et al. ........................... 707/1 |
| 5,446,887 | * | 8/1995 | Berkowitz ............................. 707/101 |
| 5,522,068 | * | 5/1996 | Berkowitz ............................. 707/101 |
| 5,553,303 | * | 9/1996 | Hayashi et al. ........................... 707/2 |
| 5,613,105 | * | 3/1997 | Zbikowski et al. .................. 707/100 |
| 5,826,253 | * | 10/1998 | Bredenberg ............................... 707/2 |
| 5,918,224 | * | 6/1999 | Bredenberg ............................... 707/2 |

* cited by examiner

Primary Examiner—Do Hyun Yoo
Assistant Examiner—Mehdi Namazi
(74) Attorney, Agent, or Firm—Cesari & McKenna, LLP

(57) ABSTRACT

A memory management system for random access memories employs a novel B-tree structure to map physical memory locations to logical addresses. In the preferred arrangement each key in the tree structure contains the physical address corresponding to the logical address identifying the key and also contains the size of the data block at that address.

The invention also provides a novel arrangement for updating B-trees in response to changes in the keys. The tree buckets containing modified keys are recorded in storage locations other than the locations containing the keys prior to modification. Thus, until the modification of the tree is complete, the system contains a record of the entire tree structure prior to the beginning of the modification.

17 Claims, 3 Drawing Sheets

FILE SYSTEM FOR NON-VOLATILE COMPUTER MEMORY

FIELD OF THE INVENTION

This invention relates to a file system for non-volatile computer memories. More particularly it relates to a system for ascertaning the physical locations of files in random access memories such as flash memories that have attributes similar to those of disk drives and the like. The invention uses an improved B-tree structure to identify the physical memory locations corresponding to logical addresses supplied by application programs that access the memory locations.

The invention is particularly applicable to memory, such as flash memory, in which data is written in blocks of various sizes and in which erasure of data to recover memory space for rewriting of data is constrained to relatively large zones of contiguous locations.

BACKGROUND OF THE INVENTION

Prior file systems for flash memories have used a multi-level paging structure to convert logical addresses to physical memory addresses. Each level in the structure corresponds to predetermined bit positions in the logical address space. For example, the root page, which is usually kept in the working random access memory, may contain entries corresponding to the first eight bits of the logical addresses. These entries contain pointers to pages in the second level, each of which contains entries corresponding to the second set of eight bits. The latter entries, in turn, point to pages in the third level, whose entries point to the physical memory locations. The second and third level pages are kept in the flash memory and retrieved as need when locations in the memory are to be accessed.

PROBLEMS RELATED TO THAT

These systems suffer from a number of disadvantages. First, there must be one entry in the page tables for each possible logical address. Second, the page tables do not directly represent the common case, in which large blocks of data are written sequentially; in order to perform large sequential transfers, software must detect sequential runs in the page tables and optimize the transfers as a separate step. Third, in order to maintain the page tables on flash memory, extra levels of indirection are required, and updates to the indexing structure are accomplished by clearing bits in place. This update-in-place operation makes page tables as used in the prior art unsuitable for some kinds of mass storage media.

The difficulties with the prior approaches are related to reliability. First, updating the map entries efficiently and consistently, in the face of power failures and other arbitrary system upsets, requires a multi-step process involving multiple updates to the same location. For some memory technologies, this process greatly increases the bit error rate. In other cases, the memory technology requires block error-correction codes. These codes make it impractical to do bit-level updates within an existing block. For other memory technologies, updating a bit requires rewriting the entire block; if power is interrupted while the block is being written, the result of the write is indeterminant.

In any case, the use of bit updates precludes the use of common block error-detection codes over the mapping table pages. Because of the nature of the data structures involved, a single bit error can cause catastrophic loss of data, with no easy way to recover the information.

SUMMARY OF THE INVENTION

A file system incorporating the invention includes a B-tree directory structure that is used to find the physical flash memory addresses corresponding to the logical addresses used by the application programs and operating system running on a computer. This B-tree is enhanced relative to a normal B-tree by improving the key structure, and by arranging never to update any existing portion of the B-tree; instead, a new partial tree is written as needed. The resulting file system is particularly suitable for flash memory, but is also suitable for RAM, EEPROM, and magnetic storage devices.

A B-tree is similar to a binary tree except that at each level it will, in general, have at least two entries at each node. To avoid confusion with terminology used in other arrangements we use the term "bucket" to denote the group of entries at each node.

The tree structure begins with a root bucket, which contains entries corresponding to a plurality of keys, i.e., logical addresses. Each entry contain in addition to a key, the physical memory address corresponding to the key. For keys that are not contained in the root bucket, there are pointers to buckets in the next level of the tree structure. These pointers are interleaved with key entries. Thus, if a key value is between the key values of two adjacent key entries, a pointer positioned between the two entries directs the search to a bucket at the next level. The search continues in the same manner in the second bucket. That is, if the key is contained in that bucket, the entry containing the key provides the physical memory address. Otherwise, a pointer, positioned between the recorded keys that bracket the search key, points to a bucket at the next level of the tree structure.

The number of levels in the tree structure depends on the number of entries allowed in each bucket and also on the total number of keys, i.e., logical memory block addresses.

Further in accordance with the invention, each recorded key preferably contains not only the logical address of the beginning of a block of data, but also the length of the block. Thus, each entry in the tree contains the following information:

A. a logical sector address "L";

B. a corresponding physical memory address "P";

C. a sector count "N";

We use the term "BN-tree" to denote this structure.

The tree structure thus represents a mapping of logical sectors L . . . (L+N−1) to physical sectors P . . . (P+N−1). This improves the efficiency of storage, since file systems normally write data sequentially and individual mappings of a sequence of memory locations can therefore be combined in a single BN-tree entry. This also improves the efficiency of large data transfers, since they require fewer (as few as 1) searches for physical memory locations, and data can be read sequentially from a longer stretch of physical memory locations into the system data buffers with a high-speed transfer loop.

The records in each BN-tree bucket are sorted in ascending order of the logical sector address L. However, the comparison technique used when searching for given logical addresses is somewhat different from that used in a conventional B-tree. In order to obtain consistent results from the BN-tree searches, the comparison routine compares the tree entries against input keys, i.e. logical addresses provided by the application programs, as follows:

A. If a canadate tree key entry ($L_x$ $N_x$) is identical to the input key ($L_r$ $N_r$), the keys are EQUAL and the entry provides the required physical address;

B. If the last sector mapped by the tree entry ($L_r+N_r-1$) is below the first sector of the input entry, then the tree entry is LESS THAN the input entry; and C. otherwise, the last sector mapped by the tree entry ($L_x+N_x-1$) is above the first sector of the input entry, but the input key is not equal to the tree entry; so the tree entry is GREATER THAN the input key entry.

If case B holds, the range of numbers L through L+N−1 for the tree entry is known not to overlap any of the numbers given by the input entry. If case C holds, the tree entry might overlap the input entry.

This algorithm defines a strict ordering when comparing the tree entries against the input key. It guarantees that the search will find either an identical record, or will position the search at the least record, i.e., key, record that is GREATER THAN the input key. This comparison routine, unlike most comparison routines is not symmetric. Specifically, it is traditional for comparison routines to return −1 to mean less than, zero to mean equal, +1 to mean greater than. If the routine is symmetric, compare (A, B)== compare (B, A). The comparison routine defined above, however, shows that in some cases, compare (A, B) is not equal to − compare (B, A). However, this does not reduce the generality of the comparison routine. In fact, reversing the order of the comparison is how possible overlaps can be confirmed. Tree entry A overlaps input entry B if and only if compare (A, B)>0 and compare (B. A) also >0.

It will be noted that one might search through a BN-tree bucket in the reverse order, i.e., from higher addresses to lower addresses, with appropriate modification of the search routine defined above. In that case the search would either find an identical record or position the search at the greatest record that is LESS THAN the candidate entry.

With the comparison routine defined, the BN-tree search uses the same subroutines for searching, and also for tree modification to reflect changes in the files recorded in the flash memory, as are used by conventional B-trees. However, insertion of a new key requires somewhat more work than a conventional B-tree insertion, because a single inserted key might partially overlap an existing key at the beginning or end of its range and might even replace a number of existing keys throughout its range. We therefore use a different insertion routine.

Specifically if the key to be inserted into the tree overlaps keys already in the tree, the insertion routine shortens the keys in the tree which overlap the new key, so that they no longer overlap the new key. A tree key that extends beyond the inserted key in both directions is split into two keys. If the key to be inserted completely overlaps one or more tree keys, then the first completely overlapped tree key is replaced by the new key, and the subsequent completely overlapped keys are deleted. An exactly matched key is simply replaced. Once the overlapped keys have been processed, the new key can be inserted. In some cases, it will already have been inserted during the processing of overlaps, as a replacement; in other cases, the new key must be added to the tree. In the preferred implementation, the standard algorithms for B-tree insertion can be applied to automatically balance the tree, including bucket rotation. It will be obvious to a practitioner skilled in the art that the standard B-tree optimizations can be applied unchanged to a key insertion in a BN-tree. In fact, the preferred implementation uses the same code that is used for B-trees or B-trees, as described by Knuth, *The Art of Computer Programming*, Vol. 3, Addison Wesley Langman (1998).

Deletion or modification of a key is handled by searching for the first matching key, using conventional methods, and then sequentially deleting keys until all overlapping keys have been deleted, with attention to the first and last keys, which might only partially overlap. Some implementations of the invention can arrange to avoid deletion of multiple keys, because in most cases, the higher-level file system that is a client of this invention only replaces logical blocks; it never deletes logical blocks. Therefore, all deletions arise from internal operations, which can be made using exact operations.

In addition, in support of this invention, as BN-tree buckets are modified, they are written back to the storage medium. Buckets or other control structures on the storage medium are not, for the reasons previously described, updated in place. Instead, whenever we modify a BN-tree bucket, we do so by reading it, modifying it in main storage, and then writing the updated bucket it to a new (unoccupied) location on the mass-storage medium.

This invention thus uses further transformations to the update strategy, as compared to a BN-tree which updates the data structures in place. We call the combination of the BN-tree methods with the new update strategy a "Single Write BN-tree system," or "BN1-tree." The update strategy is as follows.

Whenever a bucket is to be modified, we assign a new (unoccupied) location, to which we plan to write the bucket. We then read the bucket into main storage (if necessary), make the required changes, and write it to the new location at the storage medium. Since the bucket's location on the storage medium is being changed, the system must modify the parent bucket (next bucket closer to the root of the tree), which points to the bucket in its old location, to point to the bucket in its new location. This requires that the system repeat the step: read the parent bucket, assign a new location, modify it in main store, and write it to the new location. This process is followed all the way to the root bucket.

It will be obvious to a practitioner skilled in the art that combining a bucket cache, as suggested for B-trees in Knuth, with this strategy, can greatly reduce or eliminate the overhead of this step. Furthermore, it will be obvious that the order of bucket writes to the mass storage medium is unimportant, as long as the new root bucket is written last. In addition, it will be obvious that as new root blocks are written, there are effectively a series of valid BN-trees on the storage medium, each one representing a consistent "snapshot" of the tree. If the implementer elects to defer bucket writes for more performance, then the trees represent checkpoints; if the implementer elects to write immediately (for example, to implement stable storage) then the trees represent distinct states of the file system. Of course, only one tree is the most current version; all other trees represent historical (obsolete) information.

Writing of data blocks is handled similarly. Data is always written to an unoccupied location, and is never overwritten. As a given logical data block is updated, there may be many different physical locations on the storage medium that contain data for the logical data block. Only one will be the most recent; all others are obsolete.

While the foregoing update arrangement is described herein in connection with BN1-tree, it is useful, for the same reasons, in updating B1-trees, i.e., trees in which the keys do not include block lengths. Conversely, the usefulness of BN trees can be realized without the BN1 update arrangement.

Storage media have finite capacity. As the file system is written to, the number of BN1-tree buckets on the mass storage medium, and the amount of obsolete data, will grow.

On some storage media (e.g., CD-ROMs or other write-once media, a given location can be written only once. After that it cannot be used. In such a case, when all physical locations have been used, the file system is full, and no storage reclamation is possible. This file system is used in such applications for archival purposes without modifying the system software.

Other storage media (flash memories, magnetic media, and so forth) can be reused. In all such cases, it is convenient to reclaim zones of memory. On flash memories, this is because flash memories can typically be erased only in large zones. On magnetic media, this is because working in zones tends to minimize head motion. In such cases, we add a scavenging process that identifies in-use data blocks in a given zone, migrates those blocks out of the zone, and performs a media-specific operation to prepare A the zone for reuse.

For flash memories, the scavenging process also selects the zone to be reclaimed. This selection process takes into account usage patterns, so that writes are spread across the entire medium, and are not restricted to one or two blocks.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
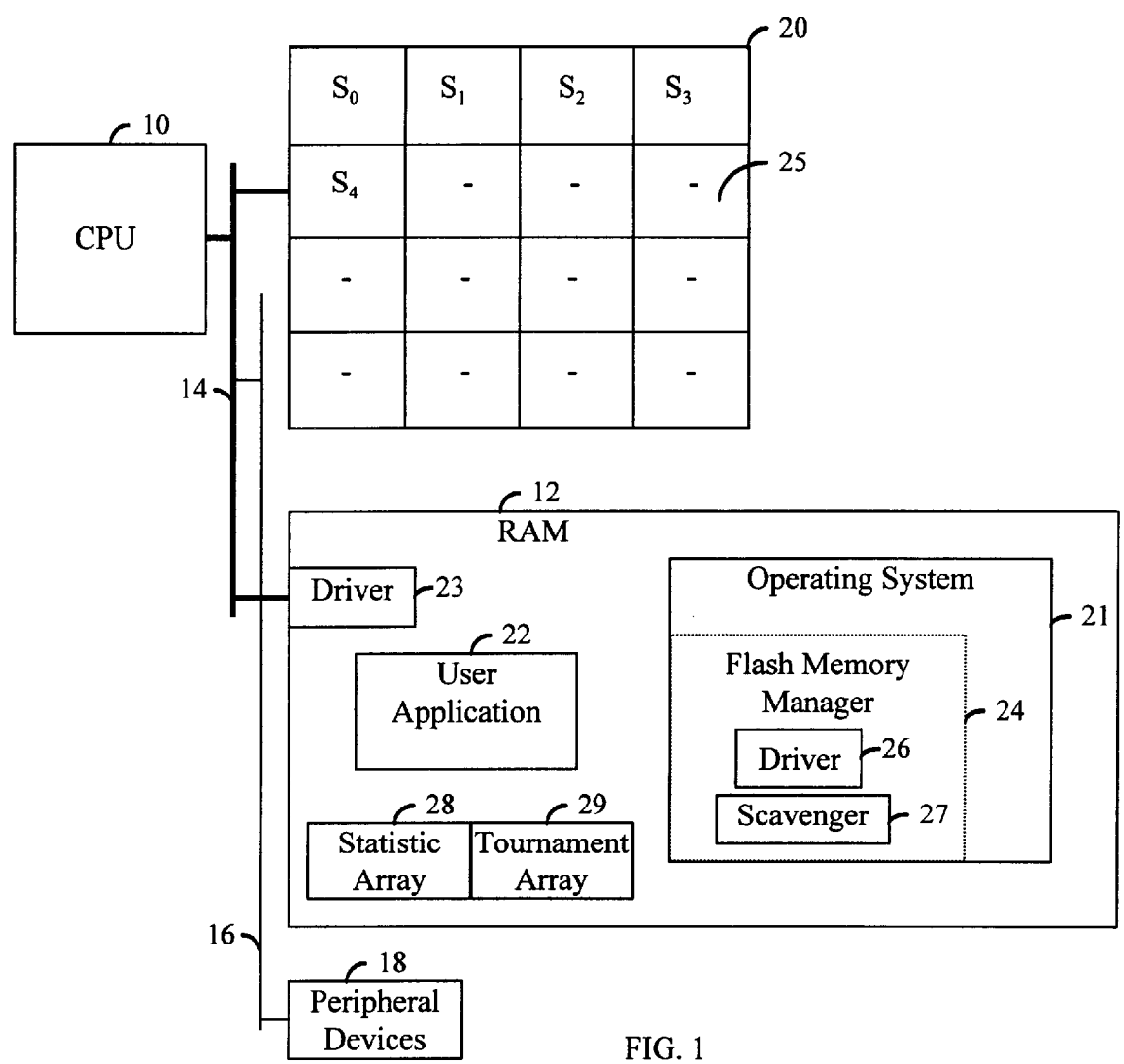
FIG. 1 is a system block diagram.

As shown in FIG. 1 a typical data processing system incorporating a flash memory includes a central processor unit (CPU) 10 that communicates with a random access memory (RAM) (main storage) 12 by means of a system bus 14. An I/O bus 16, connected to the bus 14, provides for communication with peripheral devices 18 such as disk drives, communications devices etc. A flash memory 20, which is the subject of the present invention, may be connected either to the bus 14 or the bus 16. In the illustrated system the flash memory 20 is connected to the system bus 14.

During operation of the processing system, the RAM 12 contains an operating system (OS) 21 and user applications 22. Among its various functions, the OS 21 allocates space in the RAM 12 to the respective applications. The OS also includes drivers 23 that manage data transfers with, inter alia, storage devices such as disk drives and the flash memory 20. Of particular interest in connection with the present invention, is a flash memory manager 24, which includes a flash-memory driver 26, as well as other software that manages various functions specific to flash memories.

Flash memories are characterized by the ability to write once in any location, after which the location must be erased in order to write in it again. Furthermore, these memories are constructed as groups of erase blocks such that the entire contents of an erase block must be simultaneously erased. Eventually, most of the data in an erase block is obsolete, that is, it has been replaced by data written into one or more other blocks. The block is then erased so that all of its locations are available for the writing of data. Specifically, the flash memory manager 24 uses a scavenger 27 to reclaim a block by copying data that is still valid into free space in another block. The first block can then be erased and thus returned to use.

In the case of flash memories using NAND technology, a typical erase block contains 8192 bytes of memory locations comprising 16 sectors, each of which contains 512 bytes. For efficiency and convenience we prefer to organize the memory in "sheaves" 25, each of which contains one or more erase blocks. Preferably, each sheaf 25 consists of multiple blocks, for example, eight contiguous erase blocks, i.e., 64K bytes. The sheaves 25 are treated as single units for formatting operations and also for reclamation of memory space containing obsolete data. This size is also convenient for working with other memory technologies implemented with larger erase blocks.

Figure 2:
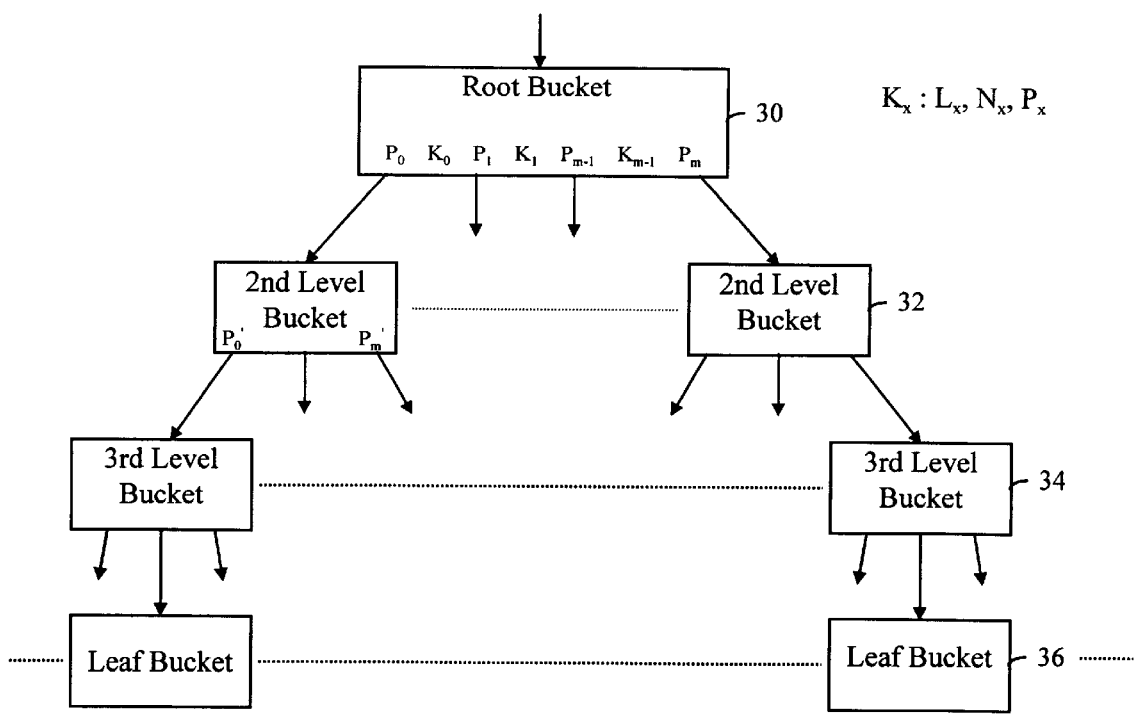
FIG. 2 is a diagram of a typical BN1-tree.

A BN1-tree structure, used to translate logical flash memory address keys received from the operating system 21 into physical addresses in the flash memory 20, is depicted in FIG. 2. As illustrated, the tree structure, which is stored in the flash memory 20, includes a root bucket 30, second-level buckets 32 identified by pointers in the root bucket, third-level buckets 34 identified by pointers in the second level buckets 32 and "leaf" buckets 36 identified by pointers in the third-level buckets 34.

Each of the buckets contains a set of key entries, each of which corresponds with the logical address of a sector in the flash memory 20 and identifies the physical location of that sector, the key entries being arranged in either ascending or descending order. In the fourth and last level of the illustrated tree structure all of the entries are key entries. The buckets in this level are known as leaf buckets 36 because they do not point to buckets in another tree level. On the other hand in the root bucket 30 and in the buckets 32 and 34 in the second and third levels, the key entries are interleaved with pointers to buckets in the next lower level.

More specifically, the root bucket 30 contains m keys $K_0$, $K_1 \ldots K_{m-1}$ interleaved with pointers $P_0, P_1 \ldots P_m$. Each of the keys K contains three parts, namely the logical address $L_x$ of the beginning of a block of data, the number of sectors $N_x$, in the block, and the physical address $A_x$ of the beginning of the block. Each of the pointers $P_x$ contains the beginning physical address of a bucket in the next lower level of the BN-tree.

Accordingly, when a flash-memory read access request is received by the driver 26 (FIG. 1), along with the logical address $L_R$ and block length $N_R$, the BN-tree system first enters the root bucket 30 and progresses through its entries using a binary or linear search. If one of the tree keys is EQUAL to the candidate entry, the search ends and the memory access operation begins at the physical address identified in the tree entry. On the other hand, if the bucket does not contain a key EQUAL to the candidate entry, the search through the root bucket 30 ends at the first key that is GREATER THAN the candidate entry; or else the search through the bucket ends after considering all keys in the bucket. The system then moves back one entry (or to the last entry) to the pointer contained therein and continues the search in the next-lower-level bucket identified by the pointer.

The latter bucket is traversed in the same manner as the root bucket 30 and, again, if an entry in the bucket contains a key equal to the input, the flash file system proceeds to the identified physical address for the requested operation. Otherwise the search is directed to a bucket in the next lower level of the BN-tree. In this manner the requested key (if it exists) will ultimately be found in root bucket 30, an intermediate-level bucket 32 or 34 or a leaf bucket 36.

If the key does not exactly exist, the search will terminate at a leaf bucket 36; either with the lowest key that is GREATER THAN the candidate entry, or at the end of the bucket. In the former case, said lowest key is selected; otherwise the search procedure uses standard B-tree procedures to find the next key in sequence after the last key in the leaf bucket 36. Unless all keys in the tree are LESS THAN the input key, the lowest key that is GREATER THAN the candidate entry will be one of the keys compared to in an upper level. If a candidate key ($L_x$, $N_x$, $P_x$) thus found is not equal to the input key, then the blocks in the range from $L_R$ to $L_x-1$ are not in the tree (perhaps because they have never been written to); and blocks $L_x$ to $L_x+N_x-1$ can be found at physical location $A_x$ to $A_x+N_x-1$. Frequently, if the request is for more blocks than were previously written in a single transfer, $L_x==L_R$, but the lengths will not match, resulting in the system taking this path. The system takes the appropriate action for the implementation of those portions of requests that have no data in the tree: it shortens the data range, and moves onto successor input keys as necessary to satisfy the entire request.

In response to a write access request, the system searches in the same manner as in a read operation. If the BN-tree has a key that matches the input key, the write data is written to a new location and the tree buckets are modified accordingly. If the tree does not contain a matching key, the system proceeds as described above for insertion of a key.

Figure 3:
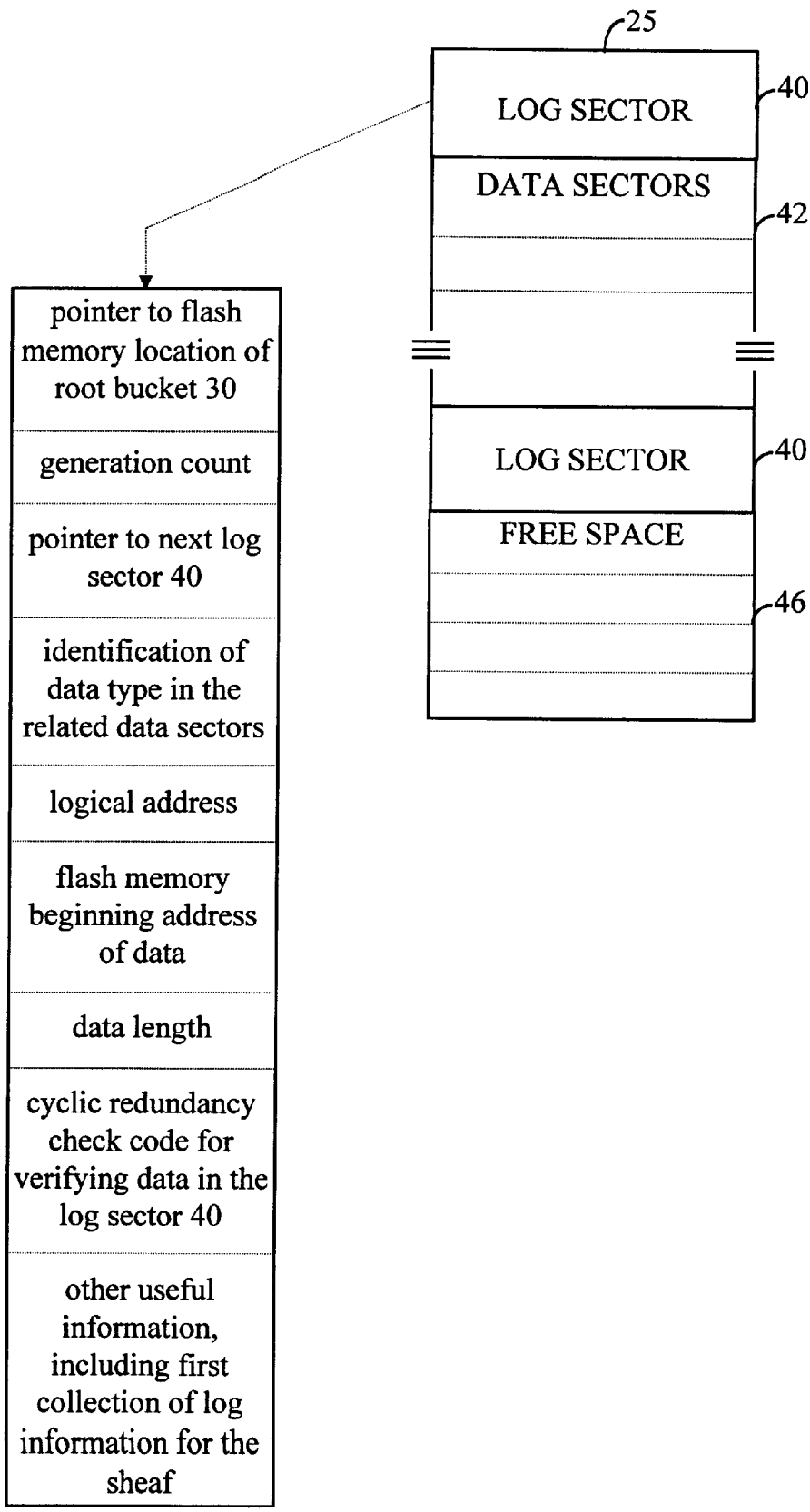
FIG. 3 is a diagram of data organization in a region on the storage medium.

The structure of a sheaf 25 is depicted in FIG. 3. The sheaf includes log sectors 40 and data sectors 42. Typically, each log sector contains system information, as well as information about related data sectors 42 that immediately follow the log sector. As additional log entries are needed, they are allocated sequentially. As shown each log sector 40 includes:

1. A pointer to the flash-memory location of the root bucket 30 as of the time the sector 42 was written;
2. A generation count that is incremented each time any log sector 40 is written to the flash memory 20; this is preferably a 64-bit number so that it is unlikely to repeat over the lifetime of the flash memory.
3. A pointer to the next log sector 40 in the sheaf.
4. An identification of the data type, in the related data sectors, e.g., a tree bucket or application data;
5. The logical address—if the data type is application data;
6. The flash memory beginning address of the data (although this may be represented implicitly and therefore omitted); and
7. The data length, i.e., number of sectors occupied by the data.
8. A cyclic redundancy check code for verifying the data in the log sector 40.
9. Other useful information, including the first collection of log information for the sheaf;

The pointer to the next log sector 40 allows the log sectors to be rewritten at any time, while continuing to use the sheaf 25 until it is full. The flash memory manager 24 allocates the next log sector 40 before it writes the current one and then places the pointer to the next log sector in the current sector.

More specifically, whenever the flash memory manager 24 assigns physical addresses in a sheaf 25 to a set of logical addresses, L . . . L+N−1, the physical addresses are assigned sequentially in the sheaf. Thus, if the address of the next available location in the sheaf is M and the first assignment of physical addresses in the sheaf corresponds to the logical locations $L_1$, . . . $L_1+N_1-1$, the system assigns, to that logical address, the physical addresses M, M+1, . . . $M+N_1-1$. The next assignment of space in the sheaf results in an entry in a log sector 40, in the next location in the sheaf, indicating an assignment of space immediately below the space reserved for the log sector. Thus, as successive assignments are made, the free space 46 between the log and data sectors and the end of the sheaf is reduced in size. For system data, e.g., the BN-tree bucket contents, each corresponding log entry contains a data-identifier and the beginning location of the bucket. Ordinarily these buckets do not have variable length and, it is therefore not necessary to record their lengths in the log entries.

Log entries are accumulated in main store (RAM 12) until a system policy decision requires that they be written to their allocated locations. Just before writing a log entry, the system allocates a location for the next log entry, and includes a pointer to that new location in the current log sector. If there is no room for a next log sector, then the sheaf is full; the system thus chooses a new sheaf to receive data and proceeds to write data in that sheaf. Because the log sectors always contain a pointer to the most valid root bucket, writing a log sector with a new root pointer effectively activates the new BN1-tree that starts with the new root pointer, and obsoletes the BN1-tree whose root bucket location was given in the previous log sector.

On system start-up the flash memory manager 24 examines the log sectors 40 of the respective sheaves 25, selects the log sector with the highest generation count, and copies the root bucket 30 identified by that log sector 40 into the RAM 12. It also selects a "current" sheaf, as described below, for use in writing operations. Whenever a read operation in the flash memory 20 is requested, the driver 26 enters the root bucket 30 and follows along the BN-tree (FIG. 2) to locate the physical addresses of the requested data. It then retrieves the data and returns it to the requesting application.

When a write operation is requested, the flash memory manager 24 assigns the required physical space in the current sheaf 25 and makes a corresponding log entry in the memory 12 (eventually written to a log sector 40 in the memory 20). The driver 26 also searches the BN-tree for a key equal to the logical address and data length supplied from the operating system 21. If that key is found, the tree-bucket containing that key is revised to indicate the new physical memory locations. Accordingly, that bucket is copied into the memory 12. Furthermore, the bucket that points to that bucket is also revised to point to the RAM 12 location of that bucket and, therefore, it also is copied into memory and revised. These revisions follow all the way to the root bucket 30. Accordingly, when a write operation is requested, each of the buckets traversed by the driver 26 is copied into the RAM 12, so that the pointers to these buckets indicate locations in the RAM 12.

If the key presented to the driver 26 for a write operation does not equal a key recorded in the BN-tree, the flash memory manager 24 inserts a new key in the BN-tree as described above. Again this may require modification of a chain of BN-tree buckets leading to the physical location of the key.

At appropriate times, which may be based on such criteria as the passage of time or the number of write operations, the modified BN-tree buckets are "committed" i.e., recorded in the flash memory 20. This operation begins with the leaf buckets and is proceeds upward in the BN-tree to the root bucket. If the computer malfunctions prior to the time the new BN-tree has been committed, i.e., prior to the time the header sector 40 pointing to the new location of the root bucket 30 has been written in the flash memory 20, the system can restart, using the copies of the tree buckets in the flash memory 20, in which case the BN-tree structure will be consistent with the data that was recorded prior to the updating of any of the BN-tree buckets in the RAM 12.

In accordance with the invention, each of the sheaves 25 in the flash memory 20 is in one of the following states:

1. obsolete—the sheaf 25 does not contain any valid data (data that has been neither logically deleted from the flash memory 20 nor superseded by data written elsewhere in the flash memory) and therefore can be erased;
2. free—the sheaf 25 has been completely erased and can therefore be freely written;
3. current—the system is actively writing to this sheaf 25; normally only one sheaf 25 is in this state at any given time;
4. in-use—the sheaf 25 contains valid data; it may therefore be used in read operations involving that data, although it may not have sufficient free space 46 for writing operations; and
5. obsolescent—the sheaf 25 contains valid data but will not contain valid data after the next time the BN-tree is committed.

When the flash memory 20 is completely erased, all the sheaves 25 start in state 2. Write operations cause the sheaves to move, as necessary, from states 2 through 4. The scavenging operation, to be described, moves sheaves from state 4 to state 5. Finally, each time the BN1-tree is committed, all the sheaves in state 5 return to state 1.

As is well known, the writing operations in a current sheaf 25 will eventually fill the sheaf 25 so that it no longer contains sufficient free space 46 (FIG. 3) for further writing operations. That is, the sheaf 25 is essentially filled with (a) valid data and (b) data that has been superseded or logically erased and is therefore no longer valid. A free sheaf is then selected as the current sheaf for further writing operations. The previously current sheaf thus acquires the in-use status.

The sheaves 25 in states 1, 2 and 5 may be considered as blank sheaves, in that they do not contain any data that has not been superseded or copied to the current sheaf or an in-use sheaf. Furthermore, the sheaves in states 1 and 2 may be thought of as "easy-erase" sheaves since they can be reused without first committing the BN-1 tree. (Committing the BN1-tree is good for reliability, but doing it too frequently can reduce overall performance.) The flash memory manager 24 employs the scavenger 27 to copy the valid data in the in-use sheaf to the current sheaf and thus make the in-use sheaf ultimately available for erasure.

Specifically the goal of the scavenger 27 is to increase the number of blank sheaves from some minimum e.g., three, to some greater number, e.g., four. The scavenger 27 begins by examining the log sectors 42 of a selected in-use sheaf. For each entry relating to application data, the flash memory manager 24 extracts the key, i.e., the logical address L and data length N. It then traces the path through the BN-tree to the corresponding physical address. If the physical address provided by the BN-tree matches the physical address in the log entry, the data in that location is valid and is copied to the current sheaf. On the other hand, if the two physical addresses do not match, or if the BN-tree does not contain the key, the data in the address identified by the log entry is no longer valid and, therefore, is not copied.

For each log entry relating to a BN-tree bucket, the scavenger 27 performs an operation similar to that for data. Specifically, it traces the logical address of a key contained in the bucket, from the root bucket down to the bucket containing the key. If it is the same bucket, the bucket is valid and is copied to the current sheaf. Otherwise, the bucket is no longer valid and is not copied. When a bucket is copied, the higher level BN-tree buckets in the chain leading to that bucket are also modified, as described above in connection with the data writing operations.

The scavenger 27 preferably selects from the in-use sheaves those that will provide the most benefit from copying of their valid data to the current sheaf. For this purpose we provide an array 28 in the RAM 12 containing sheaf statistics. Each sheaf 25 has an entry in the array 28, containing the following information:

1. The number of sectors containing valid data;
2. The number of superseded sectors that would be released if the valid data in the sheaf 25 were copied to the current sheaf,
3. A status field used for maintaining the list of sheaves in states 1, 2 and 5.

If a sheaf 25 contains valid data, the statistics array 28 contains the number of sectors in that sheaf containing such data. The count is incremented as data is written to the sheaf 25 and decremented as data in the sheaf is superseded or deleted.

A second array in the memory 12 is a sheaf tournament array 29. This array effectively contains an entry for each sheaf 25 in the in-use state. This is a partially ordered structure from which the system can identify the sheaf 25 with the fewest sectors containing valid data.

The arrays 28 and 29 are preferably stored in the flash memory 20 prior to system shutdown, so that they are available on startup. Alternatively, they can be created on startup by using the algorithm used by the scavenger 27 to ascertain the number of sectors containing valid data in each of the sheaves 25.

What is claimed is:

1. A memory system for a computer system, said memory system comprising:

A. a random access memory comprising:
   1. multiple erasure blocks each of which comprises multiple sectors of physical locations, an erasure block containing the minimum number of physical locations that are erasable in a single operation by the memory system; and
   2. multiple sheaves, each of which comprises one or more erasure blocks;

B. a B-tree file directory structure stored in a tree-storage location in said computer system and providing translations from logical input addresses to physical addresses in the random-access memory, said B-tree file directory structure including a plurality of buckets arranged in a multi-level hierarchical relationship from a root bucket to lower level buckets, each bucket containing;
   1. keys each of which includes a logical address of a data block and the physical address in the random-access memory corresponding to the logical address, and
   2. in each bucket above the lowest level also containing pointers to buckets in the next lower level; and C. means for modifying the B-tree file directory structure, in response to changes in said keys, by recording modified versions of the buckets affected by the key changes in storage locations other than the locations containing the buckets prior to tree modification, whereby until the modification of buckets is completed, the tree-storage locations contain the B-tree file directory structure existing prior to the beginning of the tree modification.

2. The memory system defined in claim 1 in which said tree-storage locations are in said random access memory.

3. The memory system defined in claim 2 in which random access memory is a non-volatile memory.

4. The memory system defined in claim 3 in which said random access memory is a flash memory.

5. The memory system of claim 1:
A. including a second memory; and
B. in which said modifying means
  1. records in said second memory the tree buckets that are modified in accordance with said key changes, the recorded buckets being further modified to reflect their locations in said second memory; and
  2. subsequently re-records the modified tree buckets in said tree storage locations after further modification to reflect the locations of the modified buckets in said tree storage locations.

6. The memory system defined in claim 1 in which each sheaf includes:
A. a plurality of data blocks, each data block for recording either application data of said computer system or a tree structure data; and
B. a plurality of log blocks including:
  1. one or more header blocks, a first header block occupying a fixed location in the sheaf, each header block containing:
    a. a pointer to the location of the root bucket in said tree storage locations as of the time the header block was written,
    b. a sequence number indicating the order in which the header block was written relative to the other header blocks in the memory system, and
    c. a pointer to the location of a header block in said sheaf that supersedes the header block; and
  2. for each data block in the sheaf containing application data, a data log block containing:
    i. the logical address of the data block, and
    ii. the physical address of the data block in the sheaf; and
  3. for each data block in the sheaf containing tree structure data, corresponding data log lock containing:
    a. the physical address of the data block; and
    b. identification of the type of tree structure data contained in the data block.

7. The memory system of claim 1 in which each of said keys includes the size of the data block at the physical address in the key.

8. The system defined in claim 4 in which the tree-storage locations are contained in said random access memory.

9. The memory system defind in claim 6 in which said random access memory is a flash memory.

10. The memory system defined in claim 8 in which each of said keys includes the size of the data block at the physical address in the key.

11. The memory system defined in claim 7 in which said random access memory is a non-volatile memory and said tree storage locations are in said non-volatile memory.

12. The memory system defined in claim 5 in which:
a. said random access memory is a non-volatile random access memory; and
b. said second memory is a volatile random access memory.

13. A memory system comprising for a computer system said memory system comprising:
A. a random access memory comprising:
  1. multiple erasure blocks each of which comprises multiple sectors of physical locations, an erasure block containing the minimum member of physical locations that are erasable in a single operation by the memory system; and
  2. multiple sheaves, each of which comprises one or more erasure blocks;
B. a B-tree file directory structure stored in a tree-storage location in said computer system and providing translations from logical input addresses to physical addresses in the random-access memory, said B-tree file directory structure including a plurality of buckets arranged in a multi-level hierarchical relationship from a root bucket to lower level buckets, each bucket containing;
  1. keys each of which includes a logical address of a data block, the physical address in the random-access memory corresponding to the logical address, and the size of the data block at the physical address; and
  2. in each bucket above the lowest level also containing pointers to buckets in the next lower level.

14. The memory system defined in claim 13 including means for modifying the B-tree file directory structure, in response to changes in said keys, by recording modified versions of the buckets affected by the key changes in storage locations other than the locations containing the buckets prior to tree modification, whereby until the modification of buckets is completed, the tree-storage locations contain the B-tree file directory structure existing prior to the beginning of the tree modification.

15. The memory system of claim 14:
A. including a second memory; and
B. in which said modifying means records in said second memory buckets that are modified in accordance with said key changes, the recorded buckets being further modified to reflect their locations in said second memory; and
  2. subsequently re-records the modified buckets in said tree storage locations after further modification to reflect the locations of the modified buckets in said storage locations.

16. The memory system defined in claim 15 in which:
a. said random access memory is a non-volatile random access memory; and
b. said second memory is a volatile random access memory.

17. The memory system defined in claim 13 in which each sheaf includes:
A. a plurality of data blocks, each data block for recording either application data of said computer system or a tree structure data; and
B. a plurality of log blocks including:
  1. one or more header blocks, a first header block occupying a fixed location in the sheaf, each header block containing:
    a. a pointer to the location of the root bucket in said tree storage locations as of the time the header block was written,
    b. a sequence number indicating the order in which the header block was written relative to the other header blocks in the memory system, and
C. a pointer to the location of a header block in said sheaf that supersedes the header block; and
  2. for each data block in the sheaf containing application data, a data log block containing:
    i. the logical address of the data block, and
    ii. the physical address of the data block in the sheaf; and
  3. for each data block in the sheaf containing tree structure data, corresponding data log lock containing:
    a. the physical address of the data block; and
    b. identification of the type of tree structure data contained in the data block.

* * * * *